United States Patent
Eriksson et al.

(10) Patent No.: US 10,541,789 B2
(45) Date of Patent: Jan. 21, 2020

(54) METHODS AND APPARATUSES FOR SIGNALING IN DYNAMIC TIME DIVISION DUPLEX SYSTEMS

(71) Applicant: Telefonaktiebolaget LM Ericsson (publ), Stockholm (SE)

(72) Inventors: Erik Eriksson, Linköping (SE); Xinghua Song, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/022,865

(22) Filed: Jun. 29, 2018

(65) Prior Publication Data

US 2018/0323912 A1 Nov. 8, 2018

Related U.S. Application Data

(63) Continuation of application No. 14/888,980, filed as application No. PCT/SE2014/050574 on May 9, 2014, now Pat. No. 10,033,487.

(Continued)

(51) Int. Cl.
*H04J 3/00* (2006.01)
*H04L 1/18* (2006.01)
(Continued)

(52) U.S. Cl.
CPC .......... *H04L 1/1854* (2013.01); *H04L 1/0006* (2013.01); *H04L 1/0025* (2013.01);
(Continued)

(58) Field of Classification Search
None
See application file for complete search history.

(56) References Cited

U.S. PATENT DOCUMENTS

| 8,811,332 B2 | 8/2014 | Yin et al. |
| 9,014,063 B2 | 4/2015 | Lee |

(Continued)

FOREIGN PATENT DOCUMENTS

| CN | 102047603 A | 5/2011 |
| CN | 102474403 A | 5/2012 |

(Continued)

OTHER PUBLICATIONS

Ericsson, et al., "Signalling support for dynamic TDD", 3GPP TSG-RAN WG1 #72, St Julian's, Malta, Jan. 28, 2013, pp. 1-3, R1-130558, 3GPP.

(Continued)

*Primary Examiner* — Clemence S Han
(74) *Attorney, Agent, or Firm* — Coats & Bennett, PLLC

(57) ABSTRACT

The present invention relates to a method in a UE served by a network node, a method in the network node, the UE, and the network node. The network node is applying dynamic TDD with flexible subframes. The method comprises receiving a first configuration message from the network node indicating a TDD reference configuration, and determining in which subframe to signal HARQ information based on the TDD reference configuration. The method further comprises receiving a second configuration message from the network node indicating a set of DL subframes that may comprise explicit signaling messages, monitoring the indicated set of DL subframes, and receiving an explicit signaling message in response to monitoring. The explicit signaling message designates a subframe in which the UE shall receive a DL signal. The method also comprises preparing to receive the DL signal in the designated subframe.

26 Claims, 12 Drawing Sheets

Related U.S. Application Data

(60) Provisional application No. 61/821,800, filed on May 10, 2013.

(51) Int. Cl.
*H04L 1/00* (2006.01)
*H04W 76/28* (2018.01)
*H04L 5/22* (2006.01)
*H04W 72/04* (2009.01)
*H04W 74/00* (2009.01)
*H04W 84/04* (2009.01)

(52) U.S. Cl.
CPC .......... *H04L 1/0027* (2013.01); *H04L 1/1812* (2013.01); *H04L 5/22* (2013.01); *H04W 72/042* (2013.01); *H04W 74/006* (2013.01); *H04W 76/28* (2018.02); *H04W 84/042* (2013.01)

(56) References Cited

U.S. PATENT DOCUMENTS

| | | | |
|---|---|---|---|
| 9,113,494 B2 | 8/2015 | Wang | |
| 9,270,399 B2 | 2/2016 | Ahn et al. | |
| 9,392,590 B2 | 7/2016 | Fu et al. | |
| 9,584,242 B2 | 2/2017 | Li et al. | |
| 9,948,432 B2* | 4/2018 | Eriksson | H04L 1/0006 |
| 10,033,487 B2* | 7/2018 | Eriksson | H04L 1/0006 |
| 2011/0103247 A1 | 5/2011 | Chen et al. | |
| 2012/0051305 A1 | 3/2012 | Wang et al. | |
| 2012/0099439 A1 | 4/2012 | Baldemair et al. | |
| 2012/0230273 A1 | 9/2012 | He et al. | |
| 2013/0194980 A1 | 8/2013 | Yin et al. | |
| 2013/0272170 A1 | 10/2013 | Chatterjee et al. | |
| 2013/0315114 A1 | 11/2013 | Seo et al. | |
| 2014/0086112 A1 | 3/2014 | Stern-Berkowitz et al. | |
| 2014/0198733 A1 | 7/2014 | Yin et al. | |
| 2014/0211770 A1 | 7/2014 | Englund et al. | |
| 2014/0334351 A1 | 11/2014 | Yin et al. | |
| 2014/0334355 A1 | 11/2014 | Ekpenyong et al. | |
| 2016/0029239 A1* | 1/2016 | Sadeghi | H04W 24/10 370/252 |

FOREIGN PATENT DOCUMENTS

| | | |
|---|---|---|
| CN | 103037527 A | 4/2013 |
| WO | 2007092245 A2 | 8/2007 |
| WO | 2011008048 A2 | 1/2011 |
| WO | 2012162877 A1 | 5/2011 |
| WO | 2012108718 A2 | 8/2012 |
| WO | 2014182238 A1 | 11/2014 |

OTHER PUBLICATIONS

3rd Generation Partnership Project, "LTE; Evolved Universal Terrestrial Radio Access (E-UTRA); Physical layer procedures", Technical Specification, ETSI TS 136 213 V11.3.0, (3GPP TS 36.213 version 11.3.0 Release 11), Jul. 1, 2013, pp. 1-178, ETSI.

Intel Corporation, "Discussion on Signalling Mechanisms for TDD UL-DL Reconfiguration", 3GPP TSG RAN WG1 Meeting #72, St. Julian's, Malta, Jan. 28, 2013, pp. 1-4, R1-130085, 3GPP.

NEC Group, "Reconfiruation signalling and HARQ-timing for TDD eIMTA system", 3GPP TSF RAN WG1 Meeting #72, St. Julian's, Malta, Jan. 28, 2013, pp. 1-3, R1-130370, 3GPP.

Catt, "Signalling Mechanisms for TDD UL-DL reconfiguration", 3GPP TSG RAN WG1 Meeting #72bis, Chicago, USA, Apr. 15, 2013, pp. 1-4, R1-130980, 3GPP.

Ericsson, et al., "Efficient use of explicit signaling", 3GPP TSG-RAN WG1 #74, Barcelona, Spain, Aug. 19, 2013, pp. 1-4, R1-133416, 3GPP.

Ericsson, "On CSI enhancements for Dynamic TDD", 3GPP TSG-RAN WG1 #72bis, Chicago, USA, Apr. 15, 2013, pp. 1-4, R1-131456, 3GPP.

Huawei, et al., "Methods to support different time scales for TDD UL.DL reconfiguration", 3GPP TSG RAN WG1 Meeting #69, Prague, Czech Republic, May 21, 2012, pp. 1-4, R1-122909, 3GPP.

Catt, "Other design aspects for TOO eIMTA", 3GPP TSG RAN WG1 Meeting #72bis, Chicago, USA, Apr. 15, 2013, pp. 1-2, R1-130981, 3GPP.

Huawei, et al., "Potential signaling enhancements for TDD eIMTA", 3GPP TSG RAN WG1 Meeting #72, St. Julian's, Malta, Jan. 28, 2013, pp. 1-6, R1-130445, 3GPP.

LG Electronics, "Additional Issues on TDD UL-DL Reconfiguration", 3GPP TSG RAN WG1 Meeting #72bis, Chicago, USA, Apr. 15, 2013, pp. 1-4, R1-131293, 3GPP.

HTC, "On HARQ Timing Issues in TDD eIMTA Systems", 3GPP TSG RAN WG1 Meeting #72bis, Chicago, USA, Apr. 15, 2013, pp. 1-5, R1-131206, 3GPP.

Huawei et al., "Backward compatibility for TDD eIMTA", 3GPP TSG RAN WG1 Meeting #72bis, Apr. 15-19, 2013, pp. 1-3, Chicago, US, R1-130884.

* cited by examiner

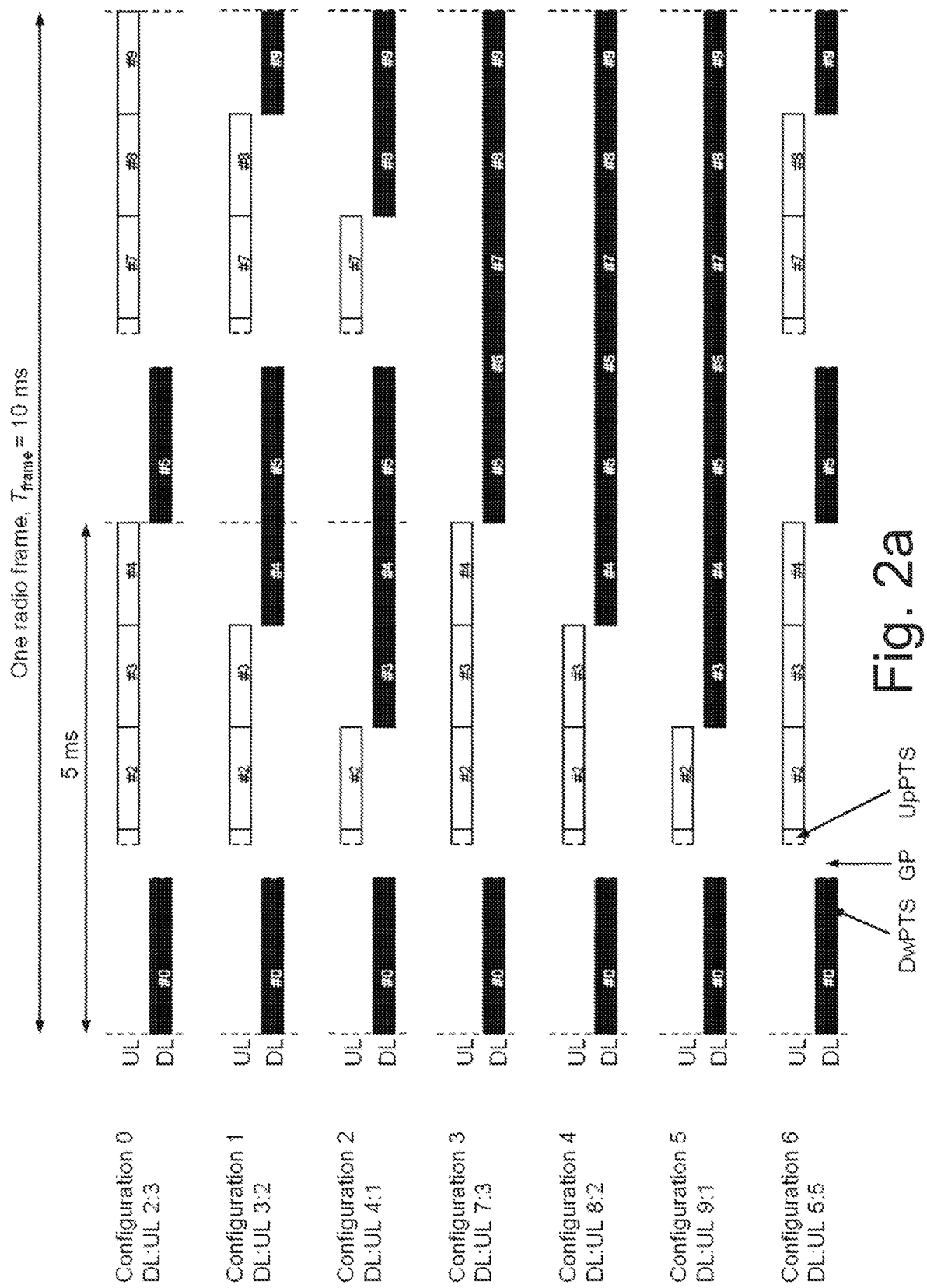

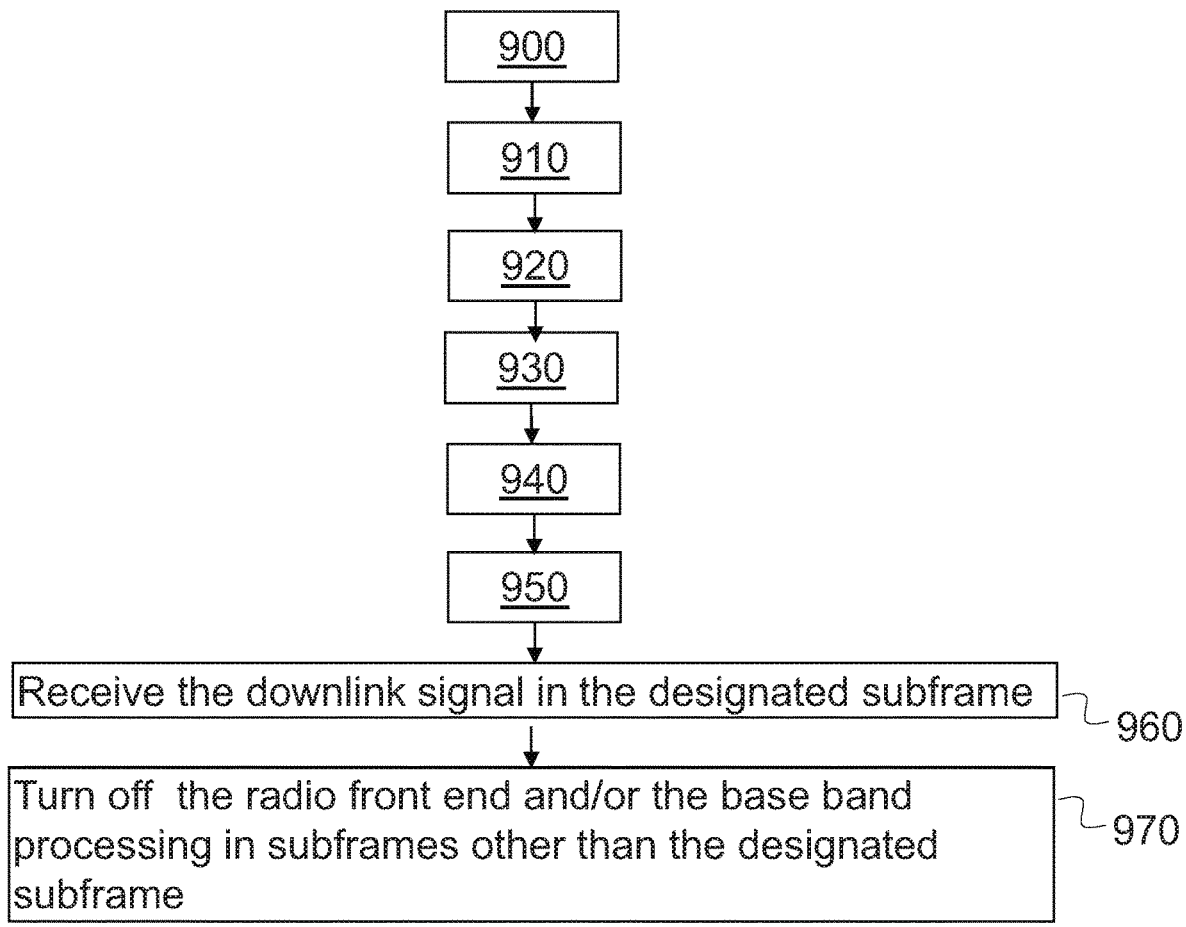

METHODS AND APPARATUSES FOR SIGNALING IN DYNAMIC TIME DIVISION DUPLEX SYSTEMS

RELATED APPLICATIONS

This application is a continuation of U.S. application Ser. No. 14/888,980, filed Nov. 4, 2015, which was the National Stage of International Application No. PCT/SE2014/050574, filed May 9, 2014, which claims the benefit of U.S. Provisional Application No. 61/821,800, filed May 10, 2013, the disclosures of each of which are incorporated herein by reference in their entirety.

TECHNICAL FIELD

The present application relates generally to signaling in a dynamic Time Division Duplex (TDD) system where at least one subframe is a flexible subframe assigned as either a downlink subframe or an uplink subframe and, more specifically, to a network node, a user equipment, and methods in the network node and the user equipment for enabling the user equipment to determine a subframe in which to receive a downlink signal and a subframe in which to signal Hybrid Automatic Repeat Request (HARQ) information.

BACKGROUND

3rd Generation Partnership Project (3GPP) Long Term Evolution (LTE) is the fourth-generation mobile communication technologies standard developed within the 3GPP to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an UTRAN and an E-UTRAN, a User Equipment (UE) is wirelessly connected to a Radio Base Station (RBS) commonly referred to as a NodeB (NB) in UMTS, and as an evolved NodeB (eNodeB or eNB) in LTE. An RBS is a general term for a radio network node capable of transmitting radio signals to a UE and receiving signals transmitted by a UE.

FIG. 1 illustrates an exemplary wireless communication system. An eNodeB 104 serves a UE 106. The eNodeB 104 transmits Downlink (DL) transmissions to the UE 106 and the UE 106 transmits Uplink (UL) transmissions to the eNodeB 104.

Wireless communication systems such as LTE systems can be configured for both Time Division Duplex (TDD) operation and Frequency Division Duplex (FDD) operation. In TDD systems, the base stations transmit and receive on the same carrier frequency. UL and DL transmissions are separated in time by designating subframes as either UL subframes or DL subframes. In FDD systems, separate carrier frequencies are used for UL and DL transmissions.

Typically, a transmitted signal in a radio communication system is organized in some form of frame structure, or frame configuration. For example, LTE generally uses ten equally sized subframes 0-9 of length 1 ms per radio frame. In case of TDD, there is generally only a single carrier frequency, and UL and DL transmissions are separated in time. Because the same carrier frequency is used for UL and DL transmission, both the base station and the UEs need to switch from transmission to reception and vice versa. An important aspect of a TDD system is to provide a sufficiently large guard time where neither DL nor UL transmissions occur in order to avoid interference between UL and DL transmissions. For LTE, special subframes provide this guard time. A TDD special subframe is generally split into three parts: a DL part (DwPTS), a guard period (GP), and an UL part (UpPTS). The remaining subframes are allocated either to UL or DL transmission.

There are seven different TDD UL/DL resource allocations in LTE, illustrated in FIG. 2a. Usually a TDD UL/DL configuration provides about 40%-90% resources for DL. In the current LTE specification, the UL/DL configuration in a TDD system is semi-statically configured which means that it is not reconfigured so often. As a result, the UL/DL configuration sometimes does not match the instantaneous traffic demands.

It is envisioned that wireless data traffic will become more and more localized in the future, as most users tend to gather in the so-called hotspots, or in indoor areas, or in residential areas. Often, when users are located in clusters, they tend to generate different UL and DL traffic patterns at different times. As such, a dynamic feature that adjusts the UL and DL resource allocations to instantaneous or short term traffic variations may be needed in local area cells. Faster TDD reconfigurations, hereinafter referred to as dynamic TDD, have shown potential for achieving good performance in both UL and DL, especially at low to medium system load. Dynamic TDD may become a standardized feature in LTE Rel-12. Dynamic TDD systems use the same TDD frame structures as the ones illustrated in FIG. 2a, but allow the TDD configuration to be changed depending on current traffic demands.

Different signaling methods that support dynamic TDD reconfigurations with different time scale are currently being considered. One possible TDD reconfiguration is allocating each subframe as either UL or DL. However, this option poses challenges to operations such as DL/UL switching, random access, radio link monitoring, and handover. Moreover, this option also makes it impossible to maintain backward compatibility with legacy UEs. A more practical solution is to designate a subset of subframes for dynamic TDD reconfiguration. In this case, the subframes can be divided into two types: static subframes and flexible subframes. The static subframes have fixed link directions, UL or DL, while flexible subframes can be dynamically assigned as either UL or DL.

When dynamic TDD is configured, in general, there are two TDD UL/DL reference configurations, one for UL and one for DL. The TDD UL reference configuration is broadcasted in System Information Block 1 (SIB1) and will be used for legacy UEs. Based on the two TDD reference configurations, some subframes may be used as flexible subframes where either DL or UL can be configured.

One area of concern with dynamic TDD is Hybrid Automatic Repeat Request (HARQ) timing. A HARQ feedback timing is associated with each DL subframe. The association determines when to transmit HARQ feedback for a transmission received in the DL subframe. The association is TDD configuration dependent.

Furthermore, with flexible subframes it may be difficult for a UE to determine when to monitor DL control channels and when to perform DL CSI measurements. A UE may decide to monitor every flexible subframe that has not been designated for UL transmissions. This may turn out to be unnecessary and would lead to heavy power consumption and false detection of a non-existing assignment.

SUMMARY

It is therefore an object to address some of the problems outlined above, and to provide a solution enabling a UE operating in a dynamic TDD system applying flexible subframes to determine when to receive DL signals and when to signal HARQ information. This object and others are achieved by the methods, the network node, and the UE according to the independent claims, and by the embodiments according to the dependent claims.

In accordance with a first aspect, a method for enabling a UE to determine a subframe in which to receive a DL signal and a subframe in which to signal HARQ information is provided. The method is performed by a network node of a wireless communication system serving the UE. The network node is applying dynamic TDD where at least one subframe is a flexible subframe assigned as either a DL subframe or an UL subframe. The method comprises transmitting a first configuration message to the UE indicating a TDD reference configuration enabling the UE to determine the subframe in which to signal HARQ information. The method further comprises transmitting a second configuration message to the UE indicating a set of DL subframes that may comprise explicit signaling messages. The transmission of the second configuration message enables the UE to monitor the indicated set of DL subframes for explicit signaling messages. The method also comprises transmitting an explicit signaling message in one of the indicated DL subframes, wherein the explicit signaling message designates a subframe in which the UE shall receive the DL signal.

In accordance with a second aspect, a method for determining a subframe in which to receive a DL signal and a subframe in which to signal HARQ information, is provided. The method is performed by a UE served by a network node of a wireless communication system. The network node is applying dynamic TDD where at least one subframe is a flexible subframe assigned as either a DL subframe or an UL subframe. The method comprises receiving a first configuration message from the network node indicating a TDD reference configuration, and determining in which subframe to signal HARQ information based on the TDD reference configuration. The method further comprises receiving a second configuration message from the network node indicating a set of DL subframes that may comprise explicit signaling messages, monitoring the indicated set of DL subframes for explicit signaling messages, and receiving an explicit signaling message in response to monitoring the indicated set of DL subframes. The explicit signaling message designates a subframe in which the UE shall receive a DL signal. The method also comprises preparing to receive the DL signal in the designated subframe.

In accordance with a third aspect, a network node for a wireless communication system configured to serve a UE is provided. The network node is configured to enable the UE to determine a subframe in which to receive a DL signal and a subframe in which to signal HARQ information. The network node is further configured to apply dynamic TDD where at least one subframe is a flexible subframe assigned as either a DL subframe or an UL subframe. The network node is configured to transmit a first configuration message to the UE indicating a TDD reference configuration enabling the UE to determine the subframe in which to signal HARQ information. The network node is further configured to transmit a second configuration message to the UE indicating a set of DL subframes that may comprise explicit signaling messages, enabling the UE to monitor the indicated set of DL subframes for explicit signaling messages. The network node is also configured to transmit an explicit signaling message in one of the indicated DL subframes, wherein the explicit signaling message designates a subframe in which the UE shall receive the DL signal.

In accordance with a fourth aspect, a UE for determining a subframe in which to receive a DL signal and a subframe in which to signal HARQ information, is provided. The UE is configured to be served by a network node of a wireless communication system. The network node is applying dynamic TDD where at least one subframe is a flexible subframe assigned as either a DL subframe or an UL subframe. The UE is further configured to receive a first configuration message from the network node indicating a TDD reference configuration, and to determine in which subframe to signal HARQ information based on the TDD reference configuration. The UE is also configured to receive a second configuration message from the network node indicating a set of DL subframes that may comprise explicit signaling messages, to monitor the indicated set of DL subframes for explicit signaling messages, and to receive an explicit signaling message in response to monitoring the indicated set of DL subframes. The explicit signaling message designates a subframe in which the UE shall receive a DL signal. The UE is also configured to prepare to receive the DL signal in the designated subframe.

An advantage of embodiments is that a semi-static TDD reference configuration is used to determine the HARQ signaling timing, while dynamic explicit signaling is used to determine subframes in which the UE shall receive a DL signal. The semi-static TDD reference configuration allows for a reliable HARQ procedure. One drawback of explicit signaling is that the UE may fail to decode the explicitly signaled information, which would be a major disadvantage as the HARQ signaling is so important for the system performance. If HARQ information is not signaled by the UE when expected by the eNodeB, the eNodeB will not be able to perform retransmissions in a correct way. However, the dynamic signaling reduces the need for blind decoding of DL control channels, thus reducing the risk of false detection of scheduling information as well as reducing the UE power consumption. Furthermore, the dynamic signaling makes it possible to make more reliable Channel State Information (CSI) measurements, as additional CSI measurement occasions in the subframes designated by the explicit signaling message are provided.

Advantages of embodiments are thus to allow a UE in a dynamic TDD system to perform accurate measurements, reduce power consumption, and increase system reliability.

Other objects, advantages and features of embodiments will be explained in the following detailed description when considered in conjunction with the accompanying drawings and claims.

BRIEF DESCRIPTION OF THE DRAWINGS

FIG. 2a is a schematic illustration of available TDD configurations for LTE systems.

FIGS. 9a-b are flowcharts illustrating the method in the UE according to embodiments.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Embodiments are described in a non-limiting general context in relation to an example scenario in an LTE radio network. However, it should be noted that the embodiments may be applied to any network technology applying dynamic TDD with flexible subframes.

Figure 1:
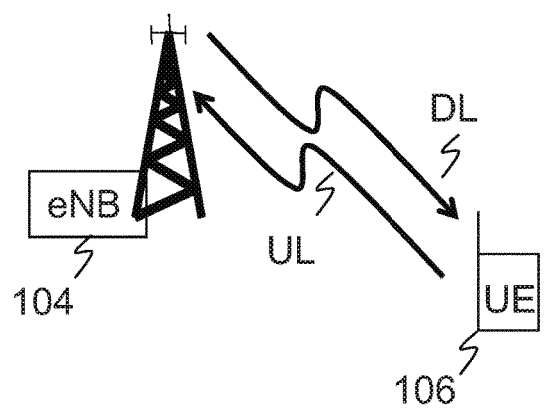
FIG. 1 is a schematic illustration of an exemplary wireless communications system.

In a LTE dynamic TDD system such as the one illustrated in FIG. 1, a radio resource such as a channel or a carrier can be dynamically configured as either UL or DL resource. An implicit Layer 1 (L1) signaling can be used to support dynamic TDD. The link direction (UL or DL) of a flexible subframe may be controlled by the eNodeB 104. UL scheduling grants and DL scheduling assignments are sent to the UE. The UL grants and the DL assignments implicitly inform the UE of the link direction of the subframes concerned by the UL grant or DL assignment. When a UE receives an UL grant concerning a particular subframe, the UE knows that the particular subframe indicated by the UL grant is used for UL transmission. When a UE does not receive an UL grant for a particular subframe, this implicitly means that the UE shall treat that subframe as DL and monitor the DL control channel of that subframe. In LTE, the DL control channel is referred to as a Physical Downlink Control Channel (PDCCH). An evolved version of the PDCCH is referred to as the enhanced PDCCH (ePDCCH). The UE thus monitors the (e)PDCCH regardless of whether this subframe is actually assigned as UL or DL by the eNodeB 104. This leads to the following two problems.

First, the UE's power consumption is increased because the UE, without an UL grant, have to blindly decode (e)PDCCH in the flexible subframes. When the flexible subframe is scheduled as DL, the UE behavior is acceptable since it has to monitor (e)PDCCH anyway to see whether it is scheduled with DL transmissions in the corresponding subframe. However, when the flexible subframe is scheduled as UL, power is wasted since there will be no DL assignment or UL scheduling grant in this subframe. Moreover, there is a risk of a false detection by the UE in the flexible subframe, meaning that the UE may falsely detect a non-existing (e)PDCCH DL assignment.

Second, without information about the link direction, it is difficult to do accurate CSI measurements in flexible subframes. One way is to do CSI measurements no matter if the flexible subframe is scheduled as UL or DL. However, this poses constraints on the UE to not do interference filtering in time, since the CSI measurement in UL flexible subframes comprises undesired intra-cell interference which does not exist when the flexible subframe is scheduled as a DL subframe. Another way is to only perform CSI measurement when the UE is scheduled with DL transmissions, i.e. in subframes known to be DL subframes. The disadvantage of this method is that the UE loses a lot of CSI measurement opportunities, which affects the accuracy of the CSI measurement.

Another way of solving the signaling of dynamic UL/DL TDD configurations compared to using the implicit L1 signaling described above is to explicitly signal a new configuration when it is applied. However, there is always a risk that a UE may not be able to decode the explicit signaling message. If the explicit signaling of a new configuration is not received by the UE, the HARQ procedure will be affected and the UE will signal HARQ information in an incorrect way. This severely affects the system performance and should be avoided.

In embodiments of the invention, the problems described above related to the implicit as well as the explicit signaling of UL/DL configuration information in dynamic TDD systems are addressed by a solution where explicit signaling is used, but only for informing the UE about subframes in which the UE shall receive a downlink signal, such as a DL signal used for measuring CSI or a DL signal comprising a control channel. The semi-statically configured UL/DL reference configuration is used for determining in what UL subframe to send the HARQ feedback information related to a transmission received in a DL subframe. The effect is that CSI measurement accuracy is improved as well as Discontinuous reception (DRX) configuration, while at the same time keeping a robust HARQ procedure.

In some embodiments, a UE is configured to monitor explicit signaling from an eNodeB. A UE may be configured by an upper-layer to monitor explicit signaling messages, signals, or data in a set of predefined subframes. These predefined subframes may also be referred to as explicit signaling monitoring occasions. The predefined subframes may be signaled or sent in a command to the UE. In one embodiment, the predefined subframes are conveyed to the UE using a set of parameters such as a subframe offset and a periodicity of the subframes.

In some embodiments, information transmitted in explicit signaling includes a set of designated subframes in which the UE should perform CSI measurements. In one embodiment, the UE does not perform CSI measurements in subframes other than those indicated in the explicit signaling. In another embodiment, the UE may still perform CSI measurements in subframes other than those indicated in the explicit signaling.

In some embodiments, explicit signaling is utilized to transmit information from an eNodeB to a UE that can be used by the UE for a DRX configuration. Information transmitted in explicit signaling may include a set of designated subframes during which the UE is supposed to monitor a control channel, e.g., PDCCH or ePDCCH. In subframes other than those indicated in the explicit signaling, the UE may enter a DRX inactive mode. During the DRX inactive mode, a UE is not operational and does not monitor PDCCHs or ePDCCHs.

In some embodiments, a reference configuration, i.e. a TDD UL/DL configuration such as one of the TDD configurations illustrated in FIG. 2a, is used to inform a UE of the subframes that contain scheduling information and HARQ timing information. As stated earlier two TDD UL/DL reference configurations are applied for dynamic TDD, one for UL and one for DL. Any subframes in addition to those indicated as DL subframes in the TDD UL/DL reference configuration for UL that the UE is required to monitor for scheduling information or to perform CSI measurements are signaled to the UE using explicit signaling. The reference configuration is thus used by the UE to determine when to send HARQ information related to a transmission received in a DL subframe, but the explicit signaling message indicates DL subframes in which the UE should decode the control channel and/or measure CSI.

In the present disclosure, methods and apparatuses are disclosed to improve the CSI measurements and the DRX configuration at a UE side with the help of explicit signaling. An explicit signaling message, data, or signal is transmitted from an eNodeB to a UE to help the UE to do CSI measurement and to monitor (e)PDCCH during a given time period. The signaling also ensures that an error caused by a missed signaling message is not propagated and that the impact of false detection, i.e., mistaking one message for a different one, is minimized.

In one embodiment, a UE is configured by higher-layers to monitor an explicit signaling in a set of predefined subframes. The predefined subframes could be signaled by a set of parameters such as a periodicity of the subframes and a subframe offset. The subframes in which the UE should monitor the explicit signaling satisfy a given condition specified by the periodicity and subframe offset, for example as shown in FIG. 2b.

Figure 2B:
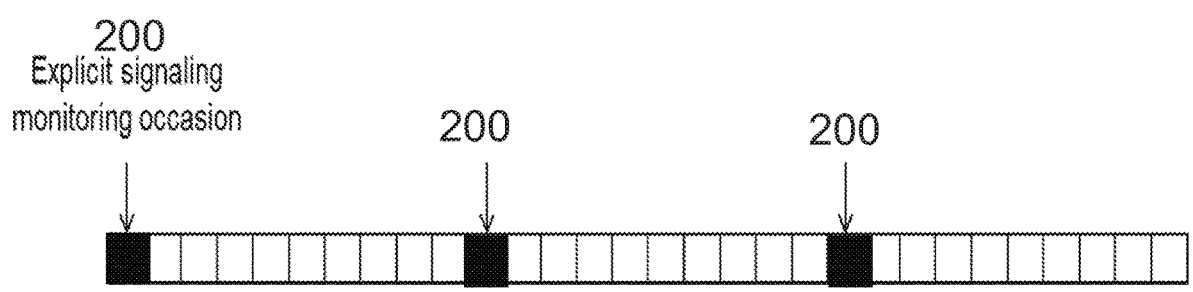
FIG. 2b is a schematic illustration of an exemplary configuration of explicit signaling in subframes.

In FIG. 2b, the dark subframes are explicit signaling monitoring occasions 200. They are predefined subframes that a UE should monitor for explicit signaling. The UE may be configured to monitor the explicit signaling in fixed DL subframes, e.g. subframe 0 in every radio frame. In one embodiment, the configuration is signaled by higher layers. In some embodiments, a separate Radio Network Temporary Identifier (RNTI) is also configured to be used for detection of configuration messages. The network may configure multiple users with the same RNTI, by multi-casting the configuration message. In another embodiment, the network may configure different RNTIs to different users by unicasting the configuration message. The already assigned Cell RNTI (C-RNTI), different for different user, can be used for this purpose.

In one embodiment, the explicit signaling is sent on the (e)PDCCH in a Downlink Control Information (DCI) either by reusing bits in one of existing DCIs or by constructing a new DCI. In some embodiments, the DCI is sent in the common search space on the control channel. In other embodiments the explicit signaling may be sent in the common search space or in a UE specific search space. The signaling may be also sent in a Medium Access Control (MAC) control element.

In another embodiment, a new physical layer signal is introduced for the explicit signaling. The signal may, for example, be carried in the resource elements in the PDCCH region not mapped to any of the existing channels. In yet another embodiment the signal is mapped to resource elements coverable by one or multiple CSI-Reference Signal configurations.

In some embodiments, the new explicit configuration, i.e. the subframes that are designated in the explicit signaling message received during an explicit signaling monitoring occasion, is applied a fixed time after the monitoring occasion. The explicitly signaled configuration is thus received by the UE at the monitoring occasion, but the configuration is not to be applied until a fixed time has lapsed from the monitoring occasion.

In some embodiments, the UE does not need to monitor the explicit signaling if the UE is in a DRX inactive mode at the time instance of the monitoring occasion. In some embodiments, the UE can be configured not to monitor the explicit signaling at all.

In a further embodiment, the content of the explicit signaling message comprises information regarding the subframes in which the UE can perform CSI measurements and configure DRX. In one example, the explicit signaling is defined as bitmap or as an UL/DL TDD configuration. The UE performs CSI measurements and monitors (e)PDCCH in subframes that are indicated as DL subframes.

Explicit Signaling to Support CSI Measurements

Explicit signaling can be used to improve CSI measurements. In one embodiment, upon receiving the explicit signaling, the UE performs CSI measurements only in a given set of subframes indicated by the explicit signaling. In subframes other than those indicated by the explicit signaling, the UE does not perform CSI measurements. In a further embodiment, the CSI reference resource is given as a subset of the subframes indicated by the explicit signaling. As an example, in dynamic TDD, the explicit signaling signals an UL/DL reference configuration, and the UE shall only do CSI measurements in subframes that are indicated as DL subframes.

In a further embodiment, when the explicit signaling cannot be detected by the UE at an explicit signaling monitoring occasion, the UE avoids performing CSI measurements in all subframes during the interval between two consecutive explicit signaling monitoring occasions. In another embodiment, when the explicit signaling cannot be detected by the UE at an explicit signaling monitoring occasion, the UE performs CSI measurements in subframes when it is scheduled for DL transmissions during the interval between two consecutive explicit signaling monitoring occasions. The reasoning is that the UE knows that the subframe is a DL subframe when it receives a DL assignment in the subframe. In yet another embodiment, the UE performs CSI measurements according to a fallback or default configuration if the explicit signaling is not detected. The fallback or default configuration may e.g. be the TDD UL/DL configuration for UL.

Explicit Signaling to Support DRX Configuration and PDCCH Monitoring

Explicit signaling can be used to improve DRX. In one embodiment, upon receiving an explicit signaling, the UE monitors (e)PDCCH only in a given set of subframes indicated by the explicit signaling. In some embodiments, the UE only monitors those subframes indicated by the explicit signal, i.e. designated subframes in the received explicit signaling message, and shall not monitor PDCCH/ePDCCH in other subframes to avoid false detection. In other embodiments, the UE monitors those subframes indicated by the explicit signaling. The UE may decide not to monitor subframes other than those signaled by the explicit signaling to save battery power. But the UE may also decide to monitor (e)PDCCH in subframes other than those indicated by the explicit signaling.

In subframes where the UE does not monitor PDCCH/ePDCCH, the UE can turn off the radio front end or the base band, or both in all or in a subset of the signaled subframes to save energy or processing resources. As an example, in dynamic TDD, the explicit signaling signals an UL/DL reference configuration, and the UE monitors (e)PDCCH in subframes that are indicated as DL subframes according to that UL/DL reference configuration. In other subframes, the UE enters a DRX inactive mode to save battery power. This embodiment is not limited to the scope of dynamic TDD but may also apply for other use cases. An example of another use case is when the explicit signaling may be applied in a network configured with almost blank subframes (ABS) for example an FDD LTE system, which leaves a number of subframes unscheduled in a node. Terminals served by such node can be informed about subframes where (e)PDCCH should not or does not need to be monitored.

In a further embodiment, when the explicit signaling cannot be detected by the UE at an explicit signaling monitoring occasion, the UE avoids monitoring (e)PDCCH in all subframes that may be (e)PDCCH subframes during the interval between two consecutive explicit signaling monitoring occasions. In one embodiment the UE follows a fallback or default configuration if the explicit signaling is not detected. The default configuration can be configured by higher layers, e.g. semi-statically configured, or specified in the standard. In another embodiment, when the explicit signaling is not detected by the UE at an explicit signaling monitoring occasion, the UE may monitor (e)PDCCH in all applicable subframes that may possibly contain (e)PDCCH according to any of the signaling options and that are not scheduled for UL transmissions, i.e. in subframes in which the UE is not scheduled for UL transmissions, during the interval between two consecutive explicit signaling monitoring occasions.

HARQ Signaling

Another application of the explicit signaling methods disclosed herein is HARQ and scheduling timing. In one embodiment, scheduling and HARQ timing is determined by a reference configuration, such as a TDD UL/DL configuration, and the explicit signaling is used to signal additional subframes to be monitored for DL scheduling and CSI measurements. As explained in the background section, there are in general two TDD UL/DL reference configurations, one for UL and one for DL, when dynamic TDD is configured. The additional subframes to be monitored for DL scheduling and CSI measurements mentioned above refers to subframes in addition to DL subframes defined by the TDD configuration for UL. The subframes are a subset of DL subframes in the TDD configuration for DL. The format of the DL control channel messages, e.g. the interpretation of UL-index/downlink assignment index bits in an UL grant, can then also follow a default configuration.

In one embodiment, UL scheduling timing is based on the reference configuration in subframes where the reference configuration has DL subframes. In other subframes, UL scheduling timing follow a TDD configuration according to a configuration sent in the explicit signaling message.

Methods and Apparatus

Figure 3:
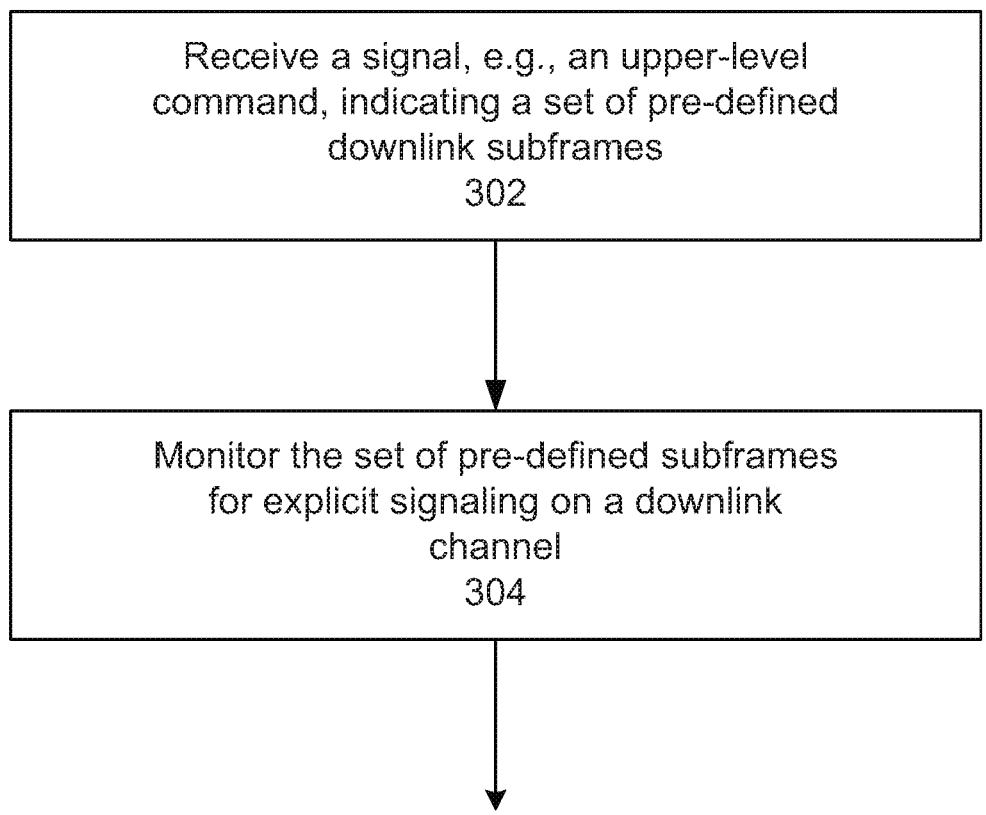
FIG. 3 is a flow chart illustrating an exemplary method for configuring a UE to monitor explicit signaling.

FIG. 3 is an exemplary flow chart illustrating a method of configuring explicit signaling at a UE. In FIG. 3, the UE receives a signal, for example, an upper-level command, indicating a set of pre-defined DL subframes (step 302). The UE then monitors the set of pre-defined subframes for explicit signaling on a DL channel (step 304).

Figure 4:
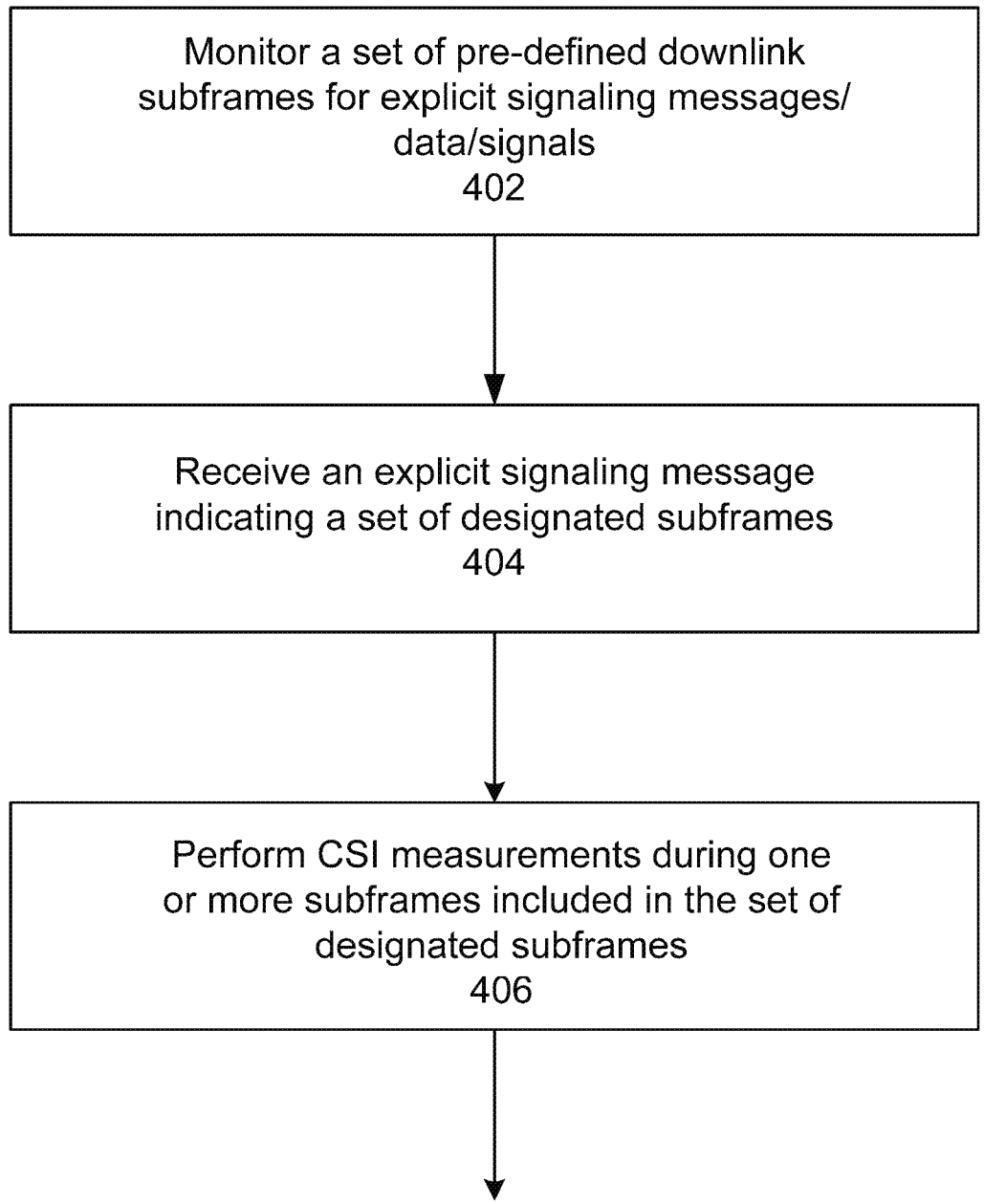
FIG. 4 is a flow chart illustrating an exemplary method for signaling CSI measurement subframes to a UE using explicit signaling.

FIG. 4 is an exemplary flow chart illustrating a method of configuring CSI measurements at a UE using explicit signaling. After being informed of the monitoring occasions for explicit signaling, the UE monitors the set of pre-defined DL subframes for explicit signaling messages/data/signals (step 402). The UE receives an explicit signaling message/data/signal that indicates a set of designated subframes (step 404). The UE performs CSI measurements during one or more subframes included in the set (step 406).

Figure 5:
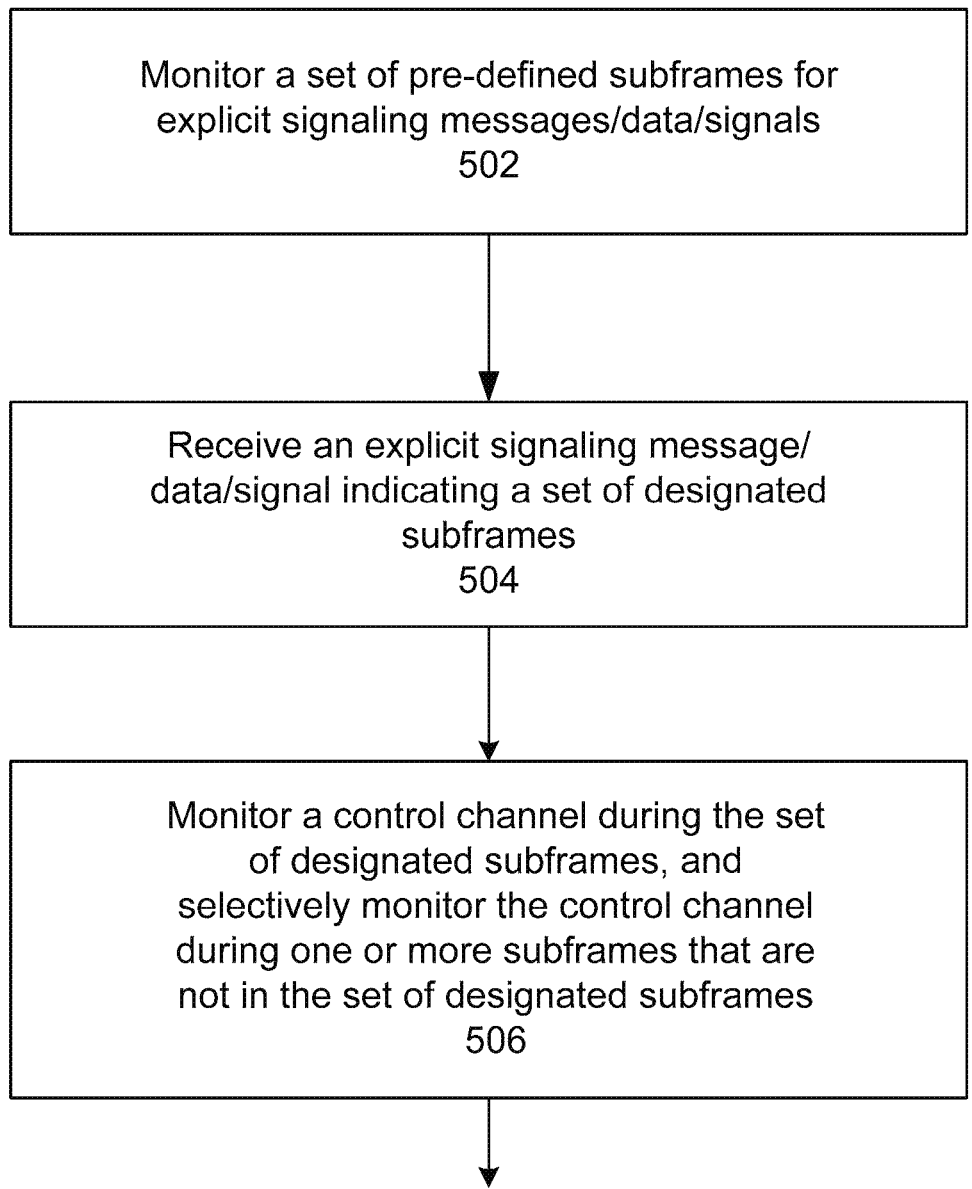
FIG. 5 is a flow chart illustrating an exemplary method for configuring a UE to monitor a control channel in a set of subframes using explicit signaling.

FIG. 5 is an exemplary flow chart illustrating a method of configuring a UE to monitor a control channel in a set of designated subframes using explicit signaling. After being informed of the monitoring occasions for explicit signaling, the UE monitors the set of pre-defined DL subframes for explicit signaling messages/data/signals (step 502). The UE receives an explicit signaling message/data/signal that indicates a set of designated subframes (step 504). During each designated subframe, the UE monitors a control channel, e.g., PDCCH/ePDCCH. In one or more subframes that are not included in the set, the UE selectively enters a DRX inactive mode and stops monitoring the control channel.

Figure 8A:
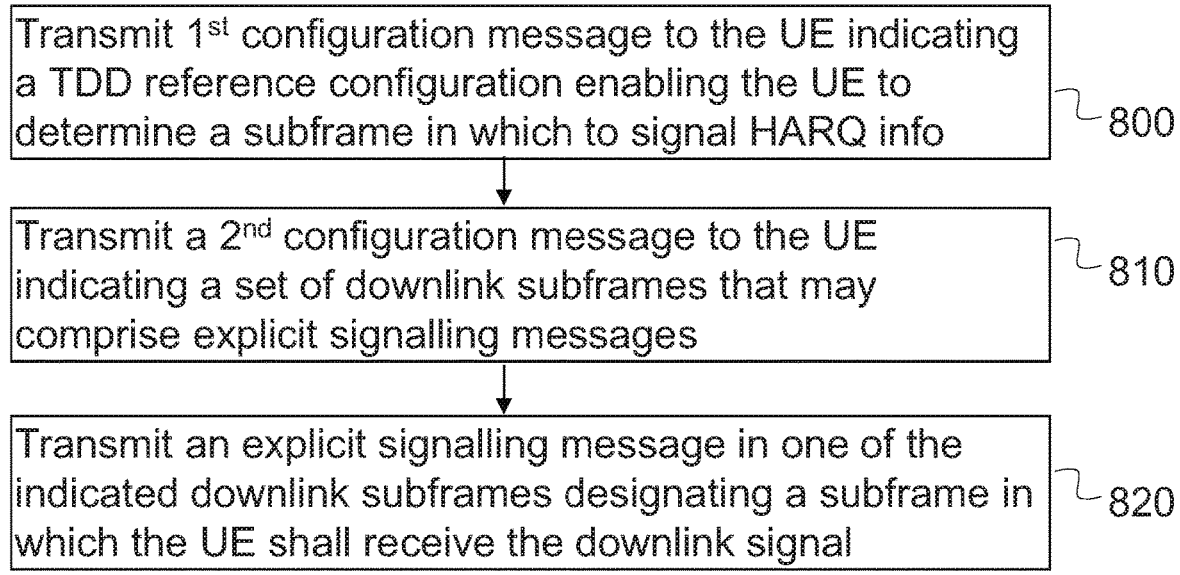
FIGS. 8a-b are flowcharts illustrating the method in the network node according to embodiments.

FIG. 8a is a flowchart illustrating one embodiment of a method for enabling a UE 700 to determine a subframe in which to receive a DL signal and a subframe in which to signal or transmit HARQ information. The method is performed by a network node 600 of a wireless communication system serving the UE. The network node is applying dynamic TDD, where at least one subframe is a flexible subframe assigned as either a DL subframe or an UL subframe. The method comprises:

800: Transmitting a first configuration message to the UE indicating a TDD reference configuration, i.e. a reference configuration used for TDD such as one of the configurations illustrated in FIG. 2a, enabling the UE to determine subframes in which to signal HARQ information. The first configuration message may be transmitted by higher layers. The first configuration message may be a configuration message that semi-statically configures the UE with a TDD reference configuration. The TDD reference configuration is thus not changed so often.

810: Transmitting a second configuration message to the UE indicating a set of DL subframes that may comprise explicit signaling messages, enabling the UE to monitor the indicated set of DL subframes for explicit signaling messages. The set of DL subframes that may comprise explicit signaling messages may be indicated by a subframe offset and a periodicity, as illustrated in FIG. 2b. The second configuration message may be transmitted together with the first configuration message in one message by a higher layer, or it may be sent in a message separate from the first configuration message. The second configuration message indicating the set of DL subframes may comprise an RNTI associated with the UE, such that the UE can identify whether the second configuration message is directed to the UE. The network may configure multiple users with the same RNTI, by multi-casting the configuration message. In another embodiment, the network may configure different RNTIs to different users by uni-casting the configuration message. The C-RNTI which is different for different UEs can be used for this purpose.

820: Transmitting an explicit signaling message in one of the indicated DL subframes, wherein the explicit signaling message designates a subframe in which the UE shall receive the DL signal. The explicit signaling message may e.g. comprise an indicator of one of the TDD configurations illustrated in FIG. 2a, thus indicating to the UE receiving the signaling message that the indicated TDD configuration designates the DL subframes in which to receive the DL signal. In one embodiment, the DL signal is to be used by the UE to measure CSI. In another embodiment, which may be combined with the previous embodiment, the DL signal comprises a DL control channel to be received by the UE, such as PDCCH or ePDCCH. In embodiments, the designation in the explicit signaling message may be applied a fixed time after the transmission of the explicit signaling message. If, as an example, the explicit signaling takes place in a radio frame, the explicitly signaled configuration may not be applied until a subsequent radio frame. In one embodiment, the wireless communication system is an LTE system and the explicit signaling message may be transmitted in a common search space on the (e)PDCCH. The explicit signaling message may be transmitted on the (e)PDCCH in a DCI either by reusing bits in one of existing DCIs or by constructing a new DCI.

Figure 8B:
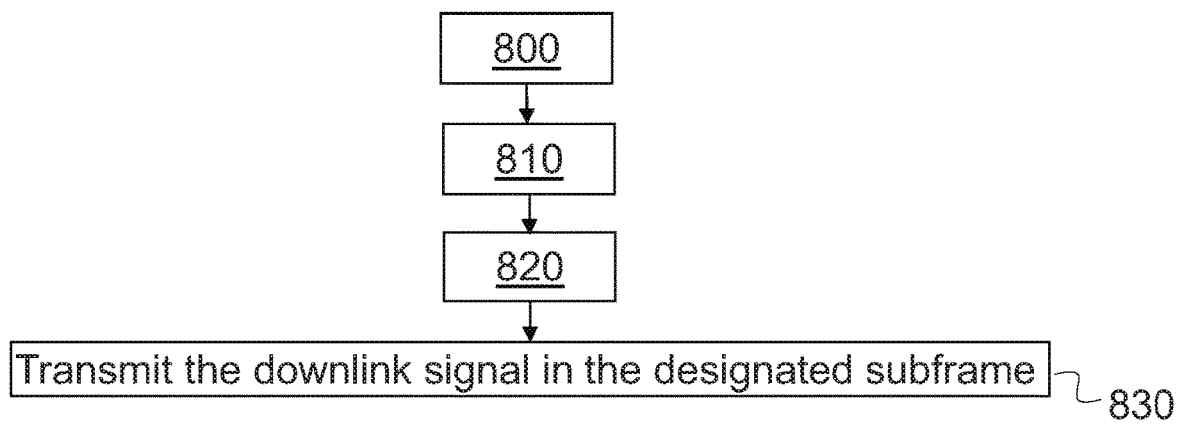

FIG. 8b is a flowchart illustrating another embodiment of the method. The method optionally also comprises after the transmitting in 800, 810, and 820 described with reference to FIG. 8a above:

830: Transmitting the DL signal in the designated subframe.

Figure 9A:
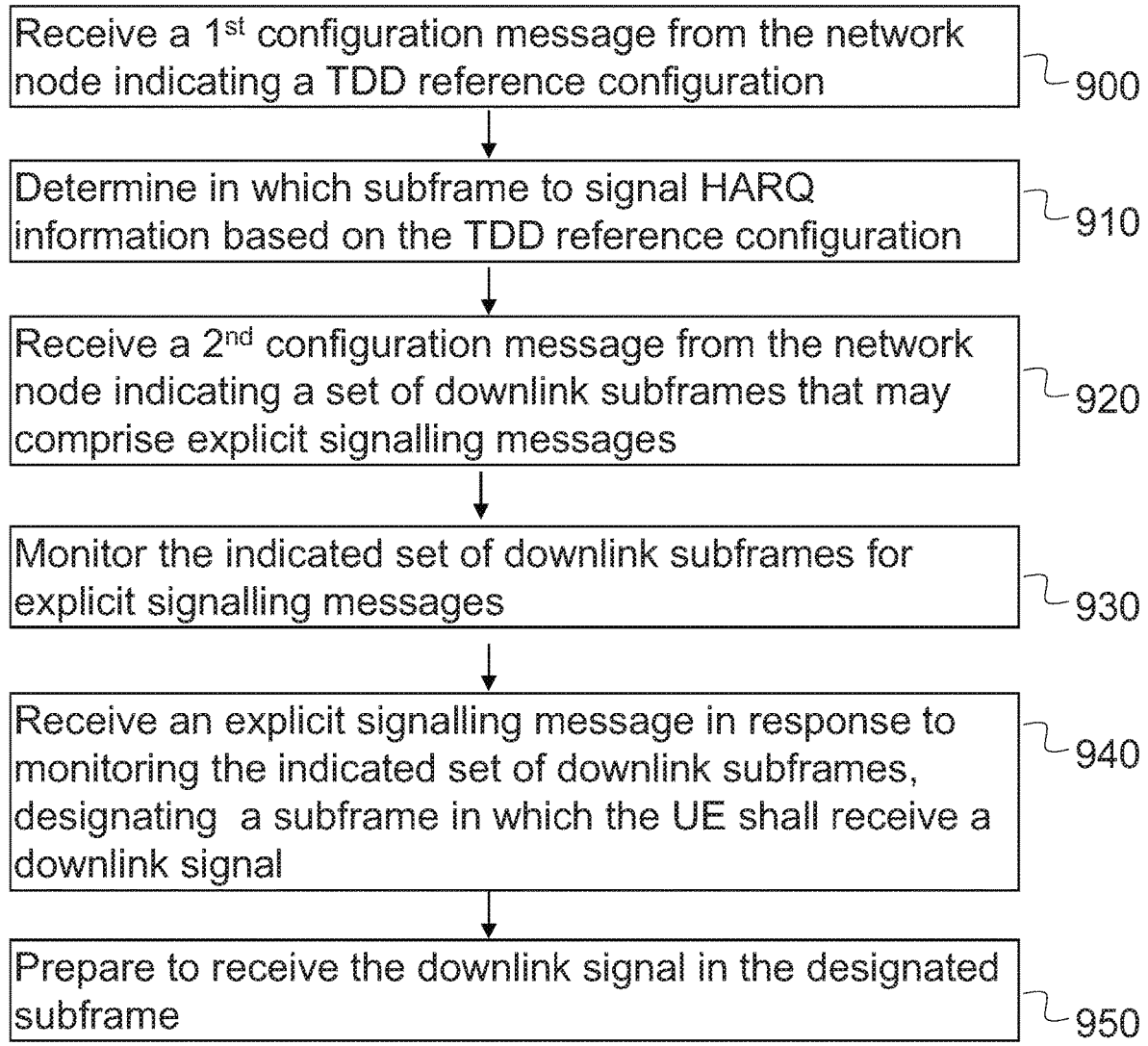

FIG. 9a is a flowchart illustrating one embodiment of a method for determining a subframe in which to receive a DL signal and a subframe in which to signal HARQ information. The method is performed by the UE 700 served by the network node 600 of a wireless communication system. The network node is applying dynamic TDD, where at least one subframe is a flexible subframe assigned as either a DL subframe or an UL subframe. The method comprises:

900: Receiving a first configuration message from the network node indicating a TDD reference configuration. The first configuration message may be a configuration message that semi-statically configures the UE with a TDD reference configuration. The TDD reference configuration is thus not changed so often.

910: Determining in which subframe to signal HARQ information based on the TDD reference configuration. By using a TDD reference configuration for the UL/DL TDD configuration to determine when to signal HARQ in the UL, the HARQ procedure is consistent and reliable HARQ information is provided which is important for the system performance.

920: Receiving a second configuration message from the network node indicating a set of DL subframes that may comprise explicit signaling messages. The set of DL subframes that may comprise explicit signaling messages may be indicated by a subframe offset and a periodicity. In one example the explicit signaling may be indicated to take place in subframe 0 of every radio frame. The second configuration message indicating the set of DL subframes may comprise an RNTI, and the second configuration message may be received by the UE when the RNTI is associated with the UE.

930: Monitoring the indicated set of DL subframes for explicit signaling messages. The indicated set of DL subframes may be monitored for explicit signaling messages only when the UE is in a DRX active mode, i.e., when the UE is operational and monitors the (e)PDCCH.

940: Receiving an explicit signaling message in response to or as a result of monitoring the indicated set of DL subframes. The explicit signaling message designates a subframe in which the UE shall receive a DL signal. In one embodiment, the wireless communication system is an LTE system and the explicit signaling message is received in a common search space of a PDCCH. The designation in the explicit signaling message may be applied a fixed time after receiving the explicit signaling message, as already described above in step 820 of the method in the network node. An advantage of the explicit signaling message is that the UE may use the information given in the explicit signaling message to determine more subframes for doing e.g. CSI measurements than would be possible with information only regarding the semi-statically configured TDD reference configuration. The CSI measurements may therefore be more reliable as more CSI measurement possibilities are provided. With only a semi-statically configured TDD reference configuration, there will be subframes for which the UE cannot determine a link direction, and for which the UE should thus avoid doing e.g. CSI measurements.

950: Preparing to receive the DL signal in the designated subframe. In embodiments, the DL signal is used to measure CSI. The DL signal may also comprise a DL control channel, such as (e)PDCCH.

The method may further comprise to receive the DL signal in a subframe according to a fallback or default configuration until the next occasion for monitoring for explicit signaling messages, when no explicit signaling message is received at the monitoring 930 of the indicated set of DL subframes. In this example embodiment, if the UE fails to decode the explicit signaling message, i.e. when no explicit signaling message is received in response to monitoring the indicated set of DL subframes, the UE may use a fallback configuration to determine when to receive the DL signal. This fallback configuration is used until next monitoring occasion, when the UE may be able to decode the explicit signaling message and act accordingly. Alternatively, the UE may use the TDD reference configuration received in the first configuration message to determine when to receive the DL signal.

FIG. 9b is a flowchart illustrating another embodiment of the method. The method optionally also comprises after the steps in 900-950 described with reference to FIG. 9a above:

960: Receiving the DL signal in the designated subframe.

970: Turning off the radio front end and/or the base band processing in one or more subframes other than the designated subframe.

Figure 6A:
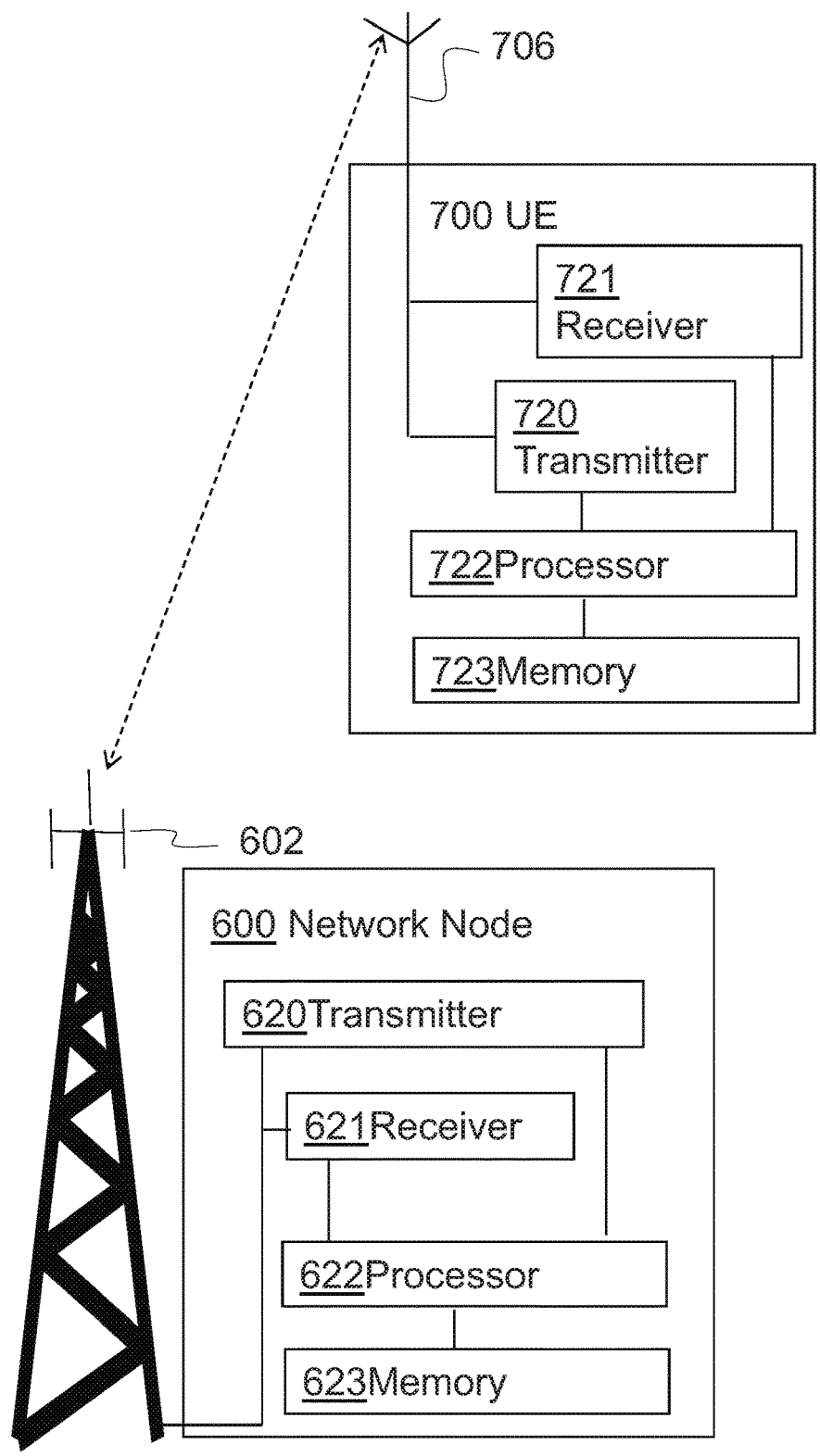
FIGS. 6a-b are block diagrams schematically illustrating embodiments of the network node and the UE.

An embodiment of the network node 600 for a wireless communication network is schematically illustrated in the block diagram in FIG. 6a. The network node 600 is configured to serve a UE 700, and to enable the UE to determine a subframe in which to receive a DL signal and a subframe in which to signal HARQ information. The network node is further configured to apply dynamic TDD where at least one subframe is a flexible subframe assigned as either a DL subframe or an UL subframe. The network node is configured to transmit a first configuration message to the UE indicating a TDD reference configuration enabling the UE to determine the subframe in which to signal HARQ information. The first configuration message may be a configuration message that semi-statically configures the UE with a TDD reference configuration. The TDD reference configuration is thus not changed so often. The network node is also configured to transmit a second configuration message to the UE indicating a set of DL subframes that may comprise explicit signaling messages, enabling the UE to monitor the indicated set of DL subframes for explicit signaling messages. The network node is further configured to transmit an explicit signaling message in one of the indicated DL subframes, wherein the explicit signaling message designates a subframe in which the UE shall receive the DL signal.

In embodiments, the network node is further configured to transmit the DL signal in the designated subframe.

The DL signal is in embodiments to be used by the UE to measure CSI. The received signal may comprise a DL control channel to be received by the UE.

In embodiments, the set of DL subframes that may comprise explicit signaling messages may be indicated by a subframe offset and a periodicity. The second configuration message indicating the set of DL subframes may comprise an RNTI associated with the UE, such that the UE can identify whether the second configuration message is directed to the UE. The network may configure multiple users with the same RNTI, by multi-casting the configuration message. In another embodiment, the network may configure different RNTIs to different users by uni-casting the configuration message. The C-RNTI which is different for different UEs can be used for this purpose.

In one embodiment, the wireless communication system is an LTE system, and the network node 600 is configured to transmit the explicit signaling message in a common search space on a PDCCH.

In embodiments, the network node 600 may be further configured to apply the designation in the explicit signaling message a fixed time after the transmission of the explicit signaling message.

An embodiment of the UE 700 is also schematically illustrated in the block diagram in FIG. 6a. The UE 700 is configured to determine a subframe in which to receive a DL signal and a subframe in which to signal HARQ information. The UE is also configured to be served by a network node of a wireless communication system. The network node is configured to apply dynamic TDD where at least one subframe is a flexible subframe assigned as either a DL subframe or an UL subframe. The UE 700 is further configured to receive a first configuration message from the network node indicating a TDD reference configuration, and to determine in which subframe to signal HARQ information based on the TDD reference configuration. The first configuration message may be a configuration message that semi-statically configures the UE with a TDD reference configuration. The TDD reference configuration is thus not changed so often. The UE 700 is also configured to receive a second configuration message from the network node indicating a set of DL subframes that may comprise explicit signaling messages, monitor the indicated set of DL subframes for explicit signaling messages, and receive an explicit signaling message in response to monitoring the indicated set of DL subframes. The explicit signaling message designates a subframe in which the UE shall receive a DL signal. The UE 700 is further configured to prepare to receive the DL signal in the designated subframe.

In embodiments, the UE 700 is further configured to receive the DL signal in the designated subframe. The DL signal may be used to measure CSI. The DL signal may also comprise a DL control channel.

The UE 700 may in embodiments be further configured to turn off at least one of the radio front end and the base band processing in one or more subframes other than the designated subframe.

The set of DL subframes that may comprise explicit signaling messages may be indicated by a subframe offset and a periodicity. The second configuration message indicating the set of DL subframes may comprise an RNTI, and the UE may be further configured to receive the second configuration message when the RNTI is associated with the UE.

In one embodiment, the wireless communication system is an LTE system, and the UE is further configured to receive the explicit signaling message in a common search space of a PDCCH or ePDCCH.

In embodiments, the designation in the explicit signaling message may be applied a fixed time after receiving the explicit signaling message.

In one embodiment, the UE 700 is further configured to monitor the indicated set of DL subframes for explicit signaling messages only when the UE is in a DRX active mode.

The UE 700 may be further configured to receive the DL signal in a subframe according to a fallback configuration until the next occasion for monitoring for explicit signaling messages. This may be done when no explicit signaling message is received at the monitoring of the indicated set of DL subframes.

In embodiments of the invention, the network node 600 may comprise a processor 622 and a memory 623. The network node 600 may also comprise a transmitter 620 and a receiver 621 configured to communicate with the UE 700, and connected to the processor 622. One or more antennas 602 are connected to the transmitter 620 and the receiver 621. The memory 623 may comprise instructions executable by the processor 622. The network node 600 may thereby be operative to transmit a first configuration message to the user equipment indicating a TDD reference configuration enabling the user equipment to determine subframes in which to signal HARQ information. The network node 600 may also be operative to transmit a second configuration message to the user equipment indicating a set of downlink subframes that may comprise explicit signaling messages, enabling the user equipment to monitor the indicated set of downlink subframes for explicit signaling messages. The network node 600 may further be operative to transmit an explicit signaling message in one of the indicated downlink subframes, wherein the explicit signaling message designates a subframe in which the user equipment shall receive the downlink signal.

In embodiments of the invention, the UE 700 may comprise a processor 722 and a memory 723. The UE 700 may also comprise a transmitter 720 and a receiver 721 configured to communicate with the network node 600, and connected to the processor 722. One or more antennas 706 are connected to the transmitter 720 and the receiver 721. The memory 723 may comprise instructions executable by the processor 722. The UE 700 may thereby be operative to receive a first configuration message from the network node indicating a TDD reference configuration, and to determine in which subframe to signal HARQ information based on the TDD reference configuration. The UE 700 may also be operative to receive a second configuration message from the network node indicating a set of downlink subframes that may comprise explicit signaling messages, to monitor the indicated set of downlink subframes for explicit signaling messages, and to receive an explicit signaling message in response to monitoring the indicated set of downlink subframes, wherein the explicit signaling message designates a subframe in which the user equipment shall receive a downlink signal. The UE 700 may further be operative to prepare to receive the downlink signal in the designated subframe.

Figure 6B:
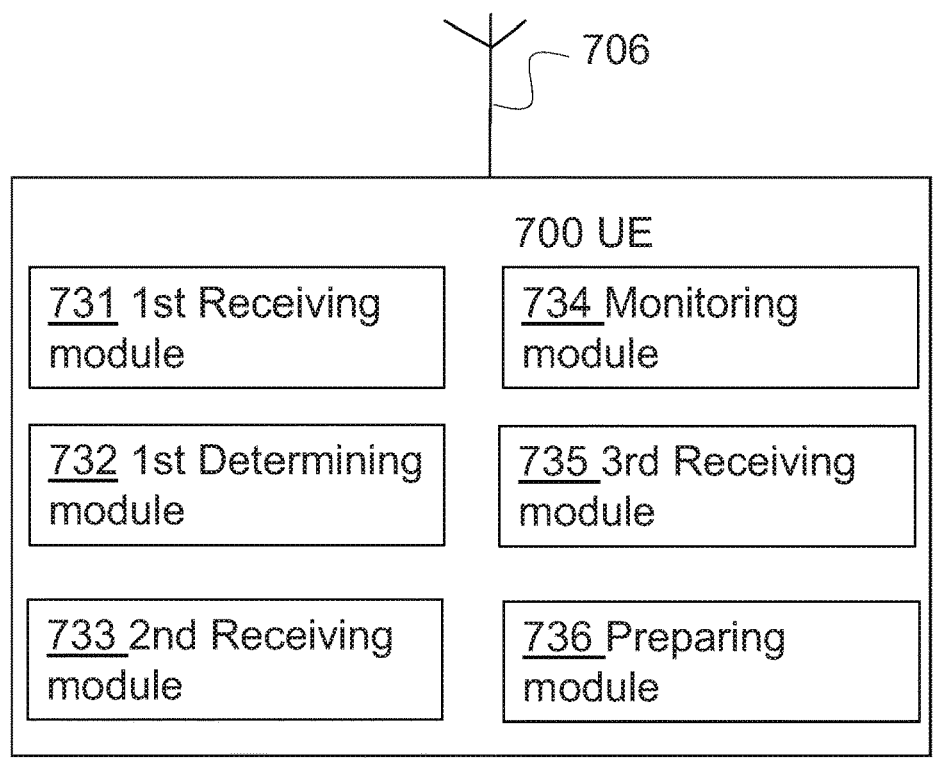
Figure 6B:
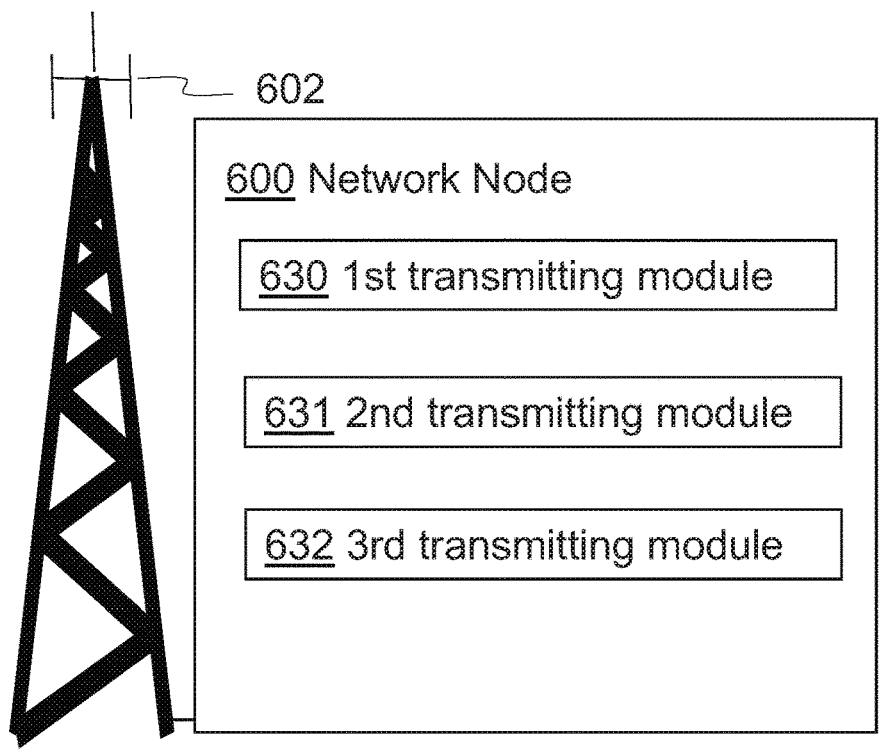

In an alternative way to describe the embodiment in FIG. 6a, illustrated in FIG. 6b, the network node 600 comprises a first transmitting module 630 adapted to transmit a first configuration message to the user equipment indicating a TDD reference configuration enabling the user equipment to determine a subframe in which to signal HARQ information. The network node 600 also comprises a second transmitting module 631 adapted to transmit a second configuration message to the user equipment indicating a set of downlink subframes that may comprise explicit signaling messages, enabling the user equipment to monitor the indicated set of downlink subframes for explicit signaling messages. The network node 600 further comprises a third transmitting module 632 adapted to transmit an explicit signaling message in one of the indicated downlink subframes, wherein the explicit signaling message designates a subframe in which the user equipment shall receive the downlink signal. The modules described above are functional units which may be implemented in hardware, software, firmware or any combination thereof. In one embodiment, the modules are implemented as a computer program running on a processor.

In FIG. 6b, the UE 700 comprises a first receiving module 731 adapted to receive a first configuration message from the network node indicating a TDD reference configuration. The UE 700 comprises a first determining module 732 adapted to determine in which subframe to signal HARQ information based on the TDD reference configuration, and a second receiving module 733 adapted to receive a second configuration message from the network node indicating a set of downlink subframes that may comprise explicit signaling messages. The UE 700 also comprises a monitoring module 734 adapted to monitor the indicated set of downlink subframes for explicit signaling messages, and a third receiving module 735 adapted to receive an explicit signaling message in response to monitoring the indicated set of downlink subframes, wherein the explicit signaling message designates a subframe in which the user equipment shall receive a downlink signal. The UE 700 further comprises a preparing module 736 adapted to prepare to receive the downlink signal in the designated subframe.

In an alternative way to describe the embodiment in FIG. 6a, the network node 600 and the UE 700 each comprise a Central Processing Unit (CPU) which may be a single unit or a plurality of units. Furthermore, the network node 600 and the UE 700 comprise at least one computer program product (CPP) in the form of a non-volatile memory, e.g. an EEPROM (Electrically Erasable Programmable Read-Only Memory), a flash memory or a disk drive. The CPPs of the network node and the UE comprise a computer program each, which comprises code means which when run on the network node 600 and the UE 700 respectively causes the CPU to perform steps of the procedure described earlier in conjunction with FIGS. 8a-b and 9a-b. In other words, when said code means are run on the CPU, they correspond to the processors 622 and 722 of FIG. 6a.

Figure 7A:
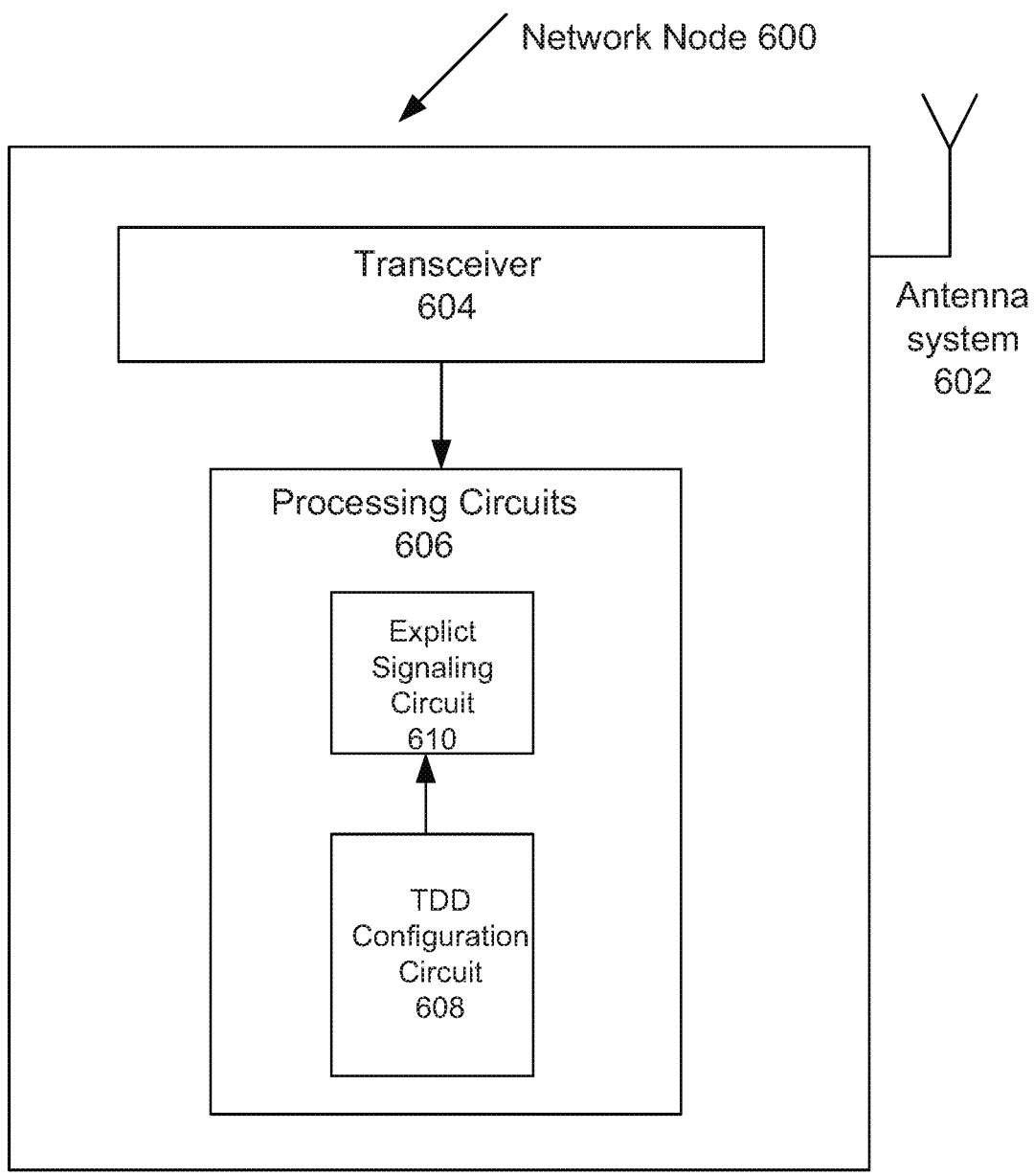
FIG. 7a illustrates an exemplary network node configured to support the explicit signaling methods disclosed herein.

FIG. 7a illustrates an exemplary network node 600 configured to support explicit signaling methods disclosed in the present application. The network node 600 comprises an antenna system 602, a transceiver 604, and processing circuits 606. The antenna system 602 is configured to transmit and receive radio signals. The transceiver 604 is configured to prepare (up-convert, digital-to-analogue convert, etc.) transmit signals and to process (down-convert and analogue-to-digital convert, etc.) received signals. The processing circuits 606 comprise a TDD configuration unit or circuit 608 and an explicit signaling unit or circuit 610. The TDD configuration unit 608 configures a radio resource (carrier, frequency or channel) for a UE's DL and UL transmissions. In one embodiment, the TDD configuration unit 608 may allocate certain LTE subframes for the UE's UL transmissions and allocate certain LTE subframes for the UE's DL transmissions. In some embodiments, some subframes may be designated for UL or DL transmissions only. Those subframes are referred to as fixed subframes. If a subframe can be used for UL and DL transmissions, although not at the same time, the subframe is referred to as a flexible subframe. Also some subframes may be reserved as almost blank subframes (ABS). In some embodiments, the network node may receive UL scheduling grants for certain flexible subframes. The UE may treat a flexible subframe that has not been scheduled for UL as a DL subframe. This is referred to as "implicit signaling" as compared to the explicit signaling methods described herein. The UE may perform CSI measurements and control channel monitoring during such flexible subframes. In some embodiments, the UE is explicitly informed of the subframes for DL transmissions. The explicit signaling unit 608 is configured to signal one or more sets of designated subframes to the UE. The UE performs CSI measurements and/or control channel monitoring based on the one or more sets of designated subframes. The UE may also configure DRX using an explicitly signaled set of subframes.

Figure 7B:
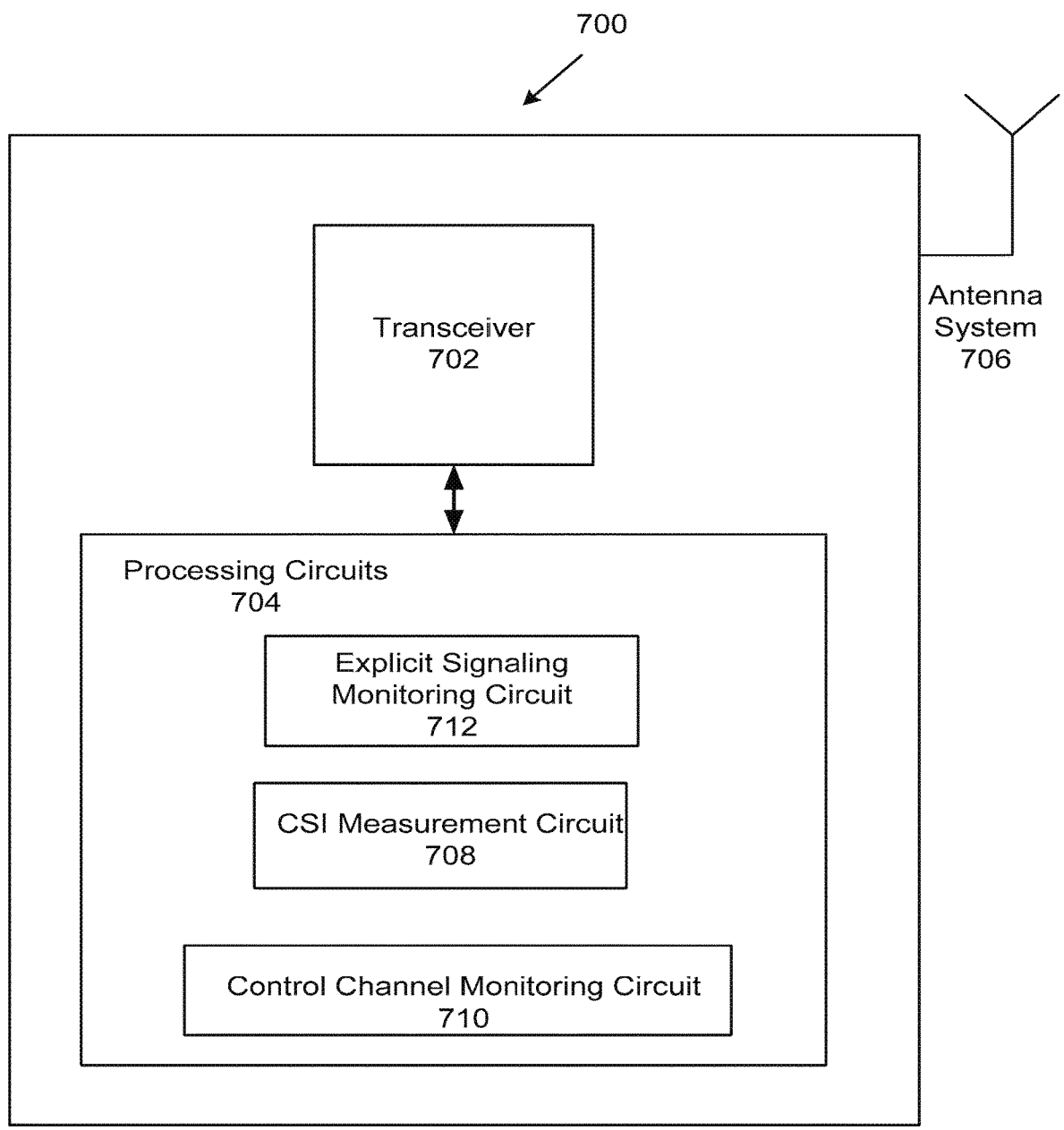
FIG. 7b illustrates an exemplary wireless device configured to support the explicit signaling methods disclosed herein.

FIG. 7b illustrates an exemplary UE 700 configured to support the explicit signaling methods disclosed herein. The UE comprises a transceiver 702, processing circuits 704, and an antenna system 706. The transceiver 702 is configured to transmit and receive radio signals via the antenna system 706. The processing circuits 704 further comprise an explicit signaling monitoring circuit 712, a CSI measurement circuit 708 and a control channel monitoring circuit 710. The explicit signaling monitoring circuit 712 is configured to monitor a set of predefined subframes for explicit signaling messages/data/signals. In some embodiments, the set of predefined subframes is received via an upper-level or higher-level command. The CSI measurement circuit 708 is configured to perform CSI measurements. In some embodiments, the CSI measurement circuit 708 is configured to perform CSI measurements during a set of designated subframes. The set of designated subframes may be received via explicit signaling from the eNodeB 104. The control channel monitoring circuit 710 is configured to monitor control channels, e.g., PDCCH or ePDCCH. In some embodiments, the control channel monitoring circuit 710 is configured to monitor a control channel during a set of designated subframes. The set of designated subframes may be received via explicit signaling from e.g. the eNodeB 104 or the network node 600. In subframes other than those received via explicit signaling, the UE 700 may enter a DRX inactive mode. During the DRX inactive mode, the UE does not monitor the control channels. In some embodiments, the UE 700 enters a DRX inactive mode in every subframe other than those indicated in explicit signaling and does not monitor control channels in those subframes. Alternatively, the UE 700 may choose to monitor a control channel in some of the subframes that are not designated for control channel monitoring by explicit signaling and enters a DRX inactive mode when not monitoring.

The above mentioned and described embodiments are only given as examples and should not be limiting. Other solutions, uses, objectives, and functions within the scope of the accompanying patent claims may be possible.

The invention claimed is:

1. A method for enabling a user equipment served by a network node to determine a subframe in which to receive a downlink signal, the method being performed by the network node in a dynamic Time Division Duplex (TDD) wireless communication system where at least one subframe is a flexible subframe assigned as either a downlink subframe or an uplink subframe, the method comprising:
    transmitting a configuration message to the user equipment indicating a fixed downlink subframe that comprises an explicit signaling message, wherein the explicit signaling message designates a subframe in which the user equipment should receive the downlink signal, and wherein the fixed downlink subframe is designated for downlink transmissions only; and
    transmitting the explicit signaling message in the indicated fixed downlink subframe.

2. The method of claim 1, wherein the configuration message indicates a TDD reference configuration.

3. The method of claim 1, further comprising transmitting the downlink signal in the designated subframe.

4. The method of claim 1, wherein the downlink signal is a signal for measuring Channel Status Information (CSI).

5. The method of claim 1, wherein the downlink signal comprises a downlink control channel to be received by the user equipment.

6. The method of claim 1, wherein the configuration message indicates a set of fixed downlink subframes one of which comprises the explicit signaling message.

7. The method of claim 6, wherein the configuration message indicates the set of fixed downlink subframes using a subframe offset or a periodicity.

8. The method of claim 1, wherein the configuration message indicates a radio network temporary identifier associated with the user equipment.

9. The method of claim 1:
wherein the wireless communication system is a Long Term Evolution (LTE) system; and
wherein the explicit signaling message is transmitted in a common search space on a physical downlink control channel (PDCCH).

10. The method of claim 1, wherein the designation in the explicit signaling message is applied a fixed time after the transmission of the explicit signaling message.

11. A method for determining a subframe in which to receive a downlink signal, the method being performed by a user equipment served by a network node in a dynamic Time Division Duplex (TDD) wireless communication system where at least one subframe is a flexible subframe assigned as either a downlink subframe or an uplink subframe, the method comprising:
receiving a configuration message from the network node indicating a fixed downlink subframe that comprises an explicit signaling message, wherein the explicit signaling message designates a subframe in which the user equipment should receive the downlink signal, and wherein the fixed downlink subframe is designated for downlink transmissions only; and
receiving the explicit signaling message in the designated subframe.

12. The method of claim 11, wherein the configuration message is a TDD reference configuration.

13. The method of claim 12, wherein the method further comprises determining in which subframe to signal HARQ information based on the TDD reference configuration.

14. The method of claim 11, wherein the method further comprises receiving the downlink signal in the designated subframe.

15. The method of claim 11, wherein the method further comprises using the downlink signal to measure Channel Status Information (CSI).

16. The method of claim 11, wherein the downlink signal comprises a downlink control channel.

17. The method of claim 11, wherein the configuration indicates a set of fixed downlink subframes one of which comprises the explicit signaling message.

18. The method of claim 17, further comprising turning off at least one of a radio front end and base band processing in subframes other than one or more designated subframes designated in one or more explicit signaling messages of the set of fixed downlink subframes.

19. The method of claim 17, wherein the configuration indicates the set of fixed downlink subframes using a subframe offset or a periodicity.

20. The method of claim 17, wherein the method further comprises monitoring the indicated set of fixed downlink subframes for the explicit signaling message only when the user equipment is in a discontinuous reception (DRX) active mode.

21. The method of claim 17, further comprising, when no explicit signaling message is received when monitoring of the indicated set of fixed downlink subframes for the explicit signaling message, receiving the downlink signal in a subframe according to a fallback configuration until a next occasion for monitoring for any explicit signaling messages.

22. The method of claim 11:
wherein the configuration message comprises a radio network temporary identifier; and
wherein the configuration message is received when the radio network temporary identifier is associated with the user equipment.

23. The method of claim 11:
wherein the wireless communication system is a Long Term Evolution (LTE) system; and
wherein the explicit signaling message is received in a common search space of a physical downlink control channel (PDCCH).

24. The method of claim 11, wherein the designation in the explicit signaling message is applied a fixed time after receiving the explicit signaling message.

25. A network node for enabling a user equipment served by the network node to determine a subframe in which to receive a downlink signal, the network node comprising:
a processor and a memory, the memory containing instructions executable by the processor whereby the network node is configured to:
operate in a dynamic Time Division Duplex (TDD) system where at least one subframe of a plurality of subframes is a flexible subframe assigned as either a downlink subframe or an uplink;
transmit a configuration message to the user equipment indicating of the plurality of subframes a fixed downlink subframe that comprises an explicit signaling message, wherein the explicit signaling message designates a subframe in which the user equipment should receive the downlink signal, and wherein the fixed downlink subframe is designated for downlink transmissions only; and
transmit the explicit signaling message in the indicated fixed downlink subframe.

26. A user equipment for determining a subframe in which to receive a downlink signal, the user equipment comprising:
a processor and a memory, the memory containing instructions executable by the processor whereby the user equipment is configured to:
operate in a dynamic Time Division Duplex (TDD) system where at least one subframe of a plurality of subframes is a flexible subframe assigned as either a downlink subframe or an uplink;
receive a configuration message from the network node indicating of the plurality of subframes a fixed downlink subframe that comprises an explicit signaling message, wherein the explicit signaling message designates a subframe in which the user equipment should receive the downlink signal, and wherein the fixed downlink subframe is designated for downlink transmissions only; and
receive the explicit signaling message in the designated subframe.

* * * * *